E197A XR 3,694,902 SR

F-96.10

Apgar et al.

3,694,902

[45] Oct. 3, 1972

[54] ELECTROLUMINESCENT DISPLAY APPARATUS

[72] Inventors: Waldo Ditmar Apgar, Fleetwood, Pa.; Lucian Arthur D'Asaro, Madison; Richard Wayne Dixon, Morristown, both of N.J.; William Henry Dufft, Shillington, Pa.; Harry Eugene Elder, Wyomissing, Pa.; Phillip Edward Fraley, Reading, Pa.

[73] Assignee: Bell Telephone Laboratories, Incorporated, Murray Hill, Berkeley Heights, N.J.

[22] Filed: Aug. 31, 1970

[21] Appl. No.: 68,426

[52] U.S. Cl. ....................29/588, 29/591, 174/DIG. 3

[51] Int. Cl. ............................................B01j 17/00

[58] Field of Search .........29/589, 569 L, 576 S, 588; 174/DIG. 3; 317/234 N, 234 M

[56] References Cited

UNITED STATES PATENTS

| | | | |
|---|---|---|---|
| 3,374,533 | 3/1968 | Burks et al | 29/589 X |
| 3,431,092 | 3/1969 | Lehner | 29/589 X |
| 3,549,782 | 12/1970 | Reifel | 174/DIG. 3 |
| 3,609,480 | 9/1971 | Gerstner | 317/235 |

*Primary Examiner*—John F. Campbell
*Assistant Examiner*—W. Tupman
*Attorney*—R. J. Guenther and Edwin B. Cave

[57] ABSTRACT

A method of fabricating electroluminescent display apparatus by forming a lead-frame from a laminate comprising two metal layers and an intervening insulating layer, is disclosed. The lead-frame comprises an array of laminate strip members, the tip of each of which may be cut back to expose the inside face of one metal layer. A light emitting semiconductor device then is mounted and electrically connected either to the inner or end face of the projecting metal layer. The other contact of the device is connected, typically by a wire lead or a metal beam lead, to the other metal layer of the laminate strip. Each semiconductor device and adjoining portion of the conductive mounting is encapsulated in a molded transparent plastic member, and supporting portions of the lead-frame then are severed to make each encapsulated diode available for individual assembly. Portions of the outer surface of the molded transparent member may be faceted and metal coated for improved light reflection and visual impact.

3 Claims, 5 Drawing Figures

INVENTORS
W.D. APGAR
L.A. D'ASARO
R.W. DIXON
W.H. DUFFT
H.E. ELDER
P.E. FRALEY
BY
ATTORNEY

ELECTROLUMINESCENT DISPLAY APPARATUS

This invention relates to electroluminescent display apparatus and more particularly to methods for fabricating such display apparatus in a manner which lends itself to easy and facile manufacture. As used herein electroluminescence refers to visible radiation from electrically excited solid state elements.

BACKGROUND OF THE INVENTION

The invention relates to the fabrication of display apparatus using light emitting semiconductor devices. The art is replete with techniques for conveniently and efficiently mounting and encapsulating solid state devices of the most minute dimensions. A variety of techniques have been developed for overcoming the very small size and other physical difficulties in fabricating useful device assemblies. However, heretofore the art has not faced the problem of efficiently mounting and connecting light emitting solid state elements. In particular, very small semiconductor elements, typically rectangular parallelepipeds having edge dimensions in the range of 5 to 20 mils have been developed to produce useful amounts of visible radiation. In order to produce such radiation, suitable electrical connections must be made to the semiconductor element to enable the application of voltage and current. Inasmuch as the radiation is emitted peripherally, and particularly in the case of red light from gallium phosphide, from substantially the entire periphery of the semiconductor element, maximum efficiency in the use of such radiation requires that the element be masked by conductive connections and mounting structure to the least practicable extent. Heretofore, approaches taken for mounting and encapsulating such light emitting elements have generally followed previously used semiconductor technology which has not produced the most efficient light emitting displays. Accordingly, there is a need for an improved and more readily manufacturable fabrication method for electroluminescent device displays.

SUMMARY OF THE INVENTION

In accordance with the method of this invention, in one aspect, the fabrication of the mounting and encapsulating structure commences with the provision of a laminate sheet comprising a pair of metal layers with an intervening insulating layer as a spacer, typically a moldable, temperature resistant plastic. The laminate sheet is formed, for example, by a punching operation, into a lead-frame by the removal of certain areas of the laminate which leaves an array of strip-like members supported from a common header. At the tip of each laminate strip one metal layer and the intervening insulating spacer may be cut back from the end leaving the other metal layer projecting therefrom.

Upon the inner or end face of the projecting metal layer, there is mounted a light-emitting semiconductor element. The other electrical connection to the element then is made by attaching a wire lead, a beam-lead, or metal ribbon from the other face of the element to the other metal member of the laminate strip. Thus, the light emitting element is mounted in an exposed situation with a minimum of its radiating surface masked by the mounting structure.

Finally, each element with its adjoining mounting structure is surrounded by a transparent plastic which may be shaped with suitable facets or other forms of reflecting surfaces to completely encapsulate the element and adjoining mounting. The supporting portions of the laminate lead-frame then are severed and removed leaving the individual encapsulated light emitting device for mounting individually or in arrays.

Thus, a feature of the invention is a three layer laminate sheet which is readily formed into a lead-frame structure for the mounting and encapsulation of a plurality of light emitting devices.

BRIEF DESCRIPTION OF THE DRAWING

The invention and its objects and other features will be more clearly understood from the following detailed description taken in conjunction with the drawing in which.

DETAILED DESCRIPTION

Figures 1, 2, 3, 4, 5:
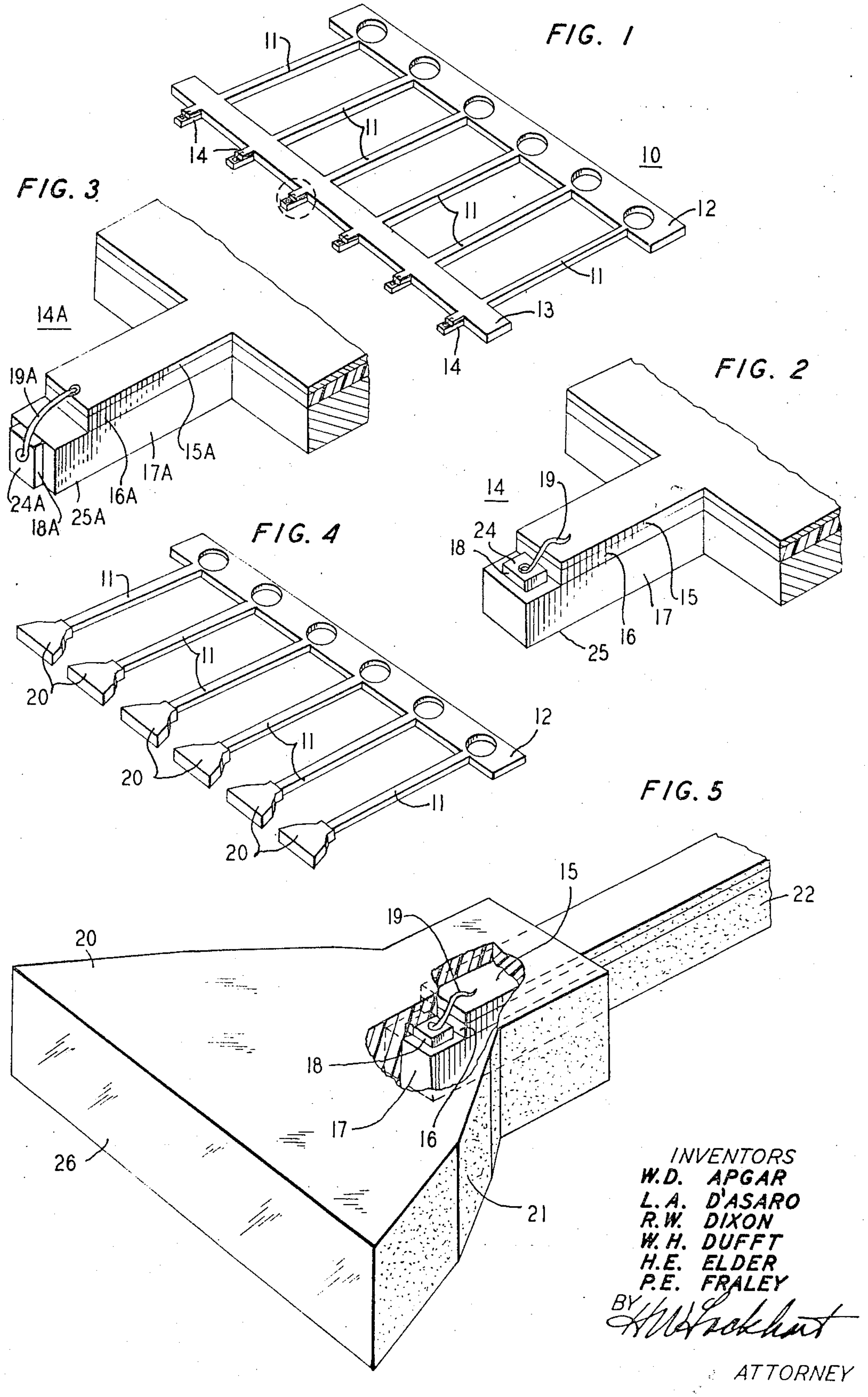
FIG. 1 is an isometric view of the lead-frame formed from the laminate sheet in accordance with the invention.
FIGS. 2 and 3 are enlarged views of the tip of one mounting strip showing a light emitting element affixed thereto.
FIG. 4 is an isometric view of the lead-frame with the molded encapsulation formed about each light emitting element.
FIG. 5 is an enlarged view with a portion cut away of a single encapsulated light emitting element in accordance with this invention.

Referring to FIG. 1, the lead-frame 10 is formed from a laminate sheet, not shown. This laminate sheet comprises two metal layers separated by an insulating layer. The lead-frame 10 is formed from a solid laminate sheet by any convenient shaping operation, for example by punching. The lead-frame 10 comprises an array of strips 11 emanating from a header 12 and supported, during fabrication, from a support web 13.

FIGS. 2 and 3 are enlargements of the tip portion of the strips 11 and depict different embodiments of the invention. Related reference numerals are used in FIGS. 2 and 3 to identify the same relative members, the numbers in FIG. 3 having the suffix A. The tip 14 of each strip 11 is shaped so that the lower metal layer 17 projects beyond the insulating layer 16 and the upper metal layer 15 in order to provide the mounting surface for the light emitting element 18. It will be appreciated that this step of shaping the tip 14 of each strip may be accomplished in conjunction with the shaping of the lead-frame 10.

In a typical embodiment the metal layers 15 and 17 may be of gold plated copper, the upper layer 15 having a thickness of about 3 mils and the lower metal layer 17 a thickness of about 15 mils. The intervening insulating layer 16 typically has a thickness of about 4 mils and in a specific embodiment may comprise an insulating material available from DuPont Inc., Wilmington, Del., identified by the trade name Pyralin.

In the embodiment shown in FIG. 2, the light emitting element 18 is mounted on the inner face of the projecting portion 25 of the lower material layer 17. In the embodiment of FIG. 3 the light emitting element 18$^A$ is mounted on the end face of the lower metal layer $17^A$. The upper surface 24 and $24^A$ of the element 18 and $18^A$, respectively, may be connected by a lead wire 19 and $19^A$ to the upper metal layer 15 and $15^A$ advantageously by thermal compression bonding. Thus, electrical connections are provided to the two terminals of the light emitting element.

Variations on the configurations shown in FIGS. 2 and 3 may be employed. For example, instead of the wire lead 19 a projection of the upper metal layer 15 may be shaped to form a connecting member and attached to the upper surface 24 of the element 18 by suitable means. Moreover, the semiconductor element may be provided with interconnections of the beam lead type for convenient mounting, particularly in connection with the arrangement shown in FIG. 3. In such an arrangement, the upper metal layer 15 and insulating layer need not be cut back. Such alternative configurations may be adopted in order to optimize the light emission from the entire periphery of the diode. The ease and facility with which the light emitting element 18 may be mounted and interconnected is clearly illustrated.

Next, as shown in FIG. 4, the tips 14 of the strip members 11, having elements 18 mounted thereon, are encapsulated in a transparent plastic. Typically the plastic encapsulation 20 is applied using an injection or transfer molding technique and a suitable plastic. As indicated in FIG. 4, the encapsulations 20 are applied to the lead-frame 10 after which the support web 13 is removed. It is advantageous, at this juncture, to fashion the encapsulations with faceted surfaces behind the element mounting and to provide these surfaces with a reflecting film, for example, by vapor depositing a thin aluminum coating. Configurations of this type for optimizing the light emission are disclosed in the U.S. Pat. No. 3,555,335 B. H. Johnson, granted Jan. 12, 1971. Plastics used for such encapsulation may be clear or suitably colored for compatibility with particular light-emitting elements.

Finally, the individual light emitting element, as shown in FIG. 5, is formed by severing each unit from the header 12 of the lead-frame. The assembly shown in FIG. 5 comprises, in effect, a self-contained lamp element having terminal end 22 with the opposite surfaces comprising the connecting leads to the lamp.

In the configuration shown and described in connection with FIG. 5, light is emitted from the face 26 in the shape of a bar. It is apparent that arrays may be formed using such bars to provide the complete range of alphanumeric characters. These arrays which operate at considerably lower power and for much longer periods of time than previously used in incandescent displays are already of considerable attractiveness. Other configurations may be provided by suitably arranging the emitting and reflecting surfaces.

We claim:

1. A method of fabricating electroluminescent display apparatus comprising (1) providing a laminate body in the form of a sheet having an insulating layer intervening layers of conductive metal on each face thereof, (2) forming said laminate body into a lead-frame comprising a header portion and an array of elongated strips projecting therefrom, said elongated strips each having a fixed end to said header portion and a tip end, (3) shaping the tip end of said elongated strips so that one conductive metal member projects beyond both the other conductive metal member and the insulating member, (4) mounting a light emitting element in conductive relation on a face of said projecting conductive member, and (5) interconnecting the other conductive metal member and said element.

2. The method in accordance with claim 1 including the further step of molding the light emitting element and adjourning laminate strip in a mass of transparent plastic having reflecting surfaces arranged thereon.

3. The method in accordance with claim 2 including the further step of completely separating said lead-frame into individual strips including the encapsulated light emitting elements.

* * * * *